UNITED STATES PATENT OFFICE 2,307,703

BENZAL ETHYL CYANOACETATE AS A PEST-CONTROL AGENT

William Moore, Stamford, Conn., assignor to American Cyanamid Company, New York, N. Y., a corporation of Maine No Drawing. Application March 25, 1941, Serial No. 385,140

1 Claim. (Cl. 167—30)

The present invention relates to a pest-control agent and more particularly to a compound which is especially effective as a contact poison for the control of insects and allied pests.

I have discovered that benzal ethyl cyanoacetate possesses strong insecticidal activity against sucking and soft-bodied insects which are particularly difficult to exterminate, for example the citrus red spider, *Tetranychus citri*, and the bean aphid, *Aphis rumicis*.

The following example illustrates a specific method of preparing the above compound in accordance with the invention. Materials employed are in parts by weight.

Example

A mixture consisting of 40 parts of ethyl cyanoacetate, 40 parts of benzaldehyde and 2 parts of piperidine (catalyst) was allowed to stand for 16 hours in a closed vessel at approximately 5° C. Considerable water had separated at the end of this period. The reaction product was dissolved in ether, washed neutral (0.05% $H_2SO_4$), and dried over sodium sulfate. The residue which crystallized upon removal of the ether was recrystallized from ethyl alcohol. The product, benzal ethyl cyanoacetate, was a colorless crystalline material which melted at 52° C.

Spray solutions were prepared by dissolving the benzal ethyl cyanoacetate in a solvent medium consisting of 65% acetone and 35% water. A 99% control was obtained when a spray of 1–1000 dilution was used against the citrus red spider, *Tetranychus citri*. At a dilution of 1–500 the insecticide gave a 95% control on the bean aphid, *Aphis rumicis*.

Although the compound of this invention is especially effective as a contact poison for the control of insect pests, it may also be used for fungicidal and bactericidal purposes.

This new insecticide may be applied in any of the conventional manners. Thus, for example, it may be used in an aqueous emulsion or incorporated in organic liquids such as the aliphatic and aromatic hydrocarbons for spraying purposes, or it may be effectively used in dusts with such inert solid diluents as kieselguhr, wood flour, walnut shell, talc, and the like.

While the invention has been described with particular reference to specific embodiments, it is to be understood that it is not to be limited thereto, but is to be construed broadly and restricted solely by the scope of the appended claim.

I claim:

An insecticide containing as an active ingredient benzal ethyl cyanoacetate.

WILLIAM MOORE.